(12) United States Patent
Stryjewski et al.

(10) Patent No.: US 11,561,294 B2
(45) Date of Patent: Jan. 24, 2023

(54) LASER SAFETY SYSTEM

(71) Applicants: John Stryjewski, Merritt Island, FL (US); William B. Griffis, Mims, FL (US)

(72) Inventors: John Stryjewski, Merritt Island, FL (US); William B. Griffis, Mims, FL (US)

(73) Assignee: Vision Engineering Solutions, LLC, Merritt Island, FL (US)

( * ) Notice: Subject to any disclaimer, the term of this patent is extended or adjusted under 35 U.S.C. 154(b) by 951 days.

(21) Appl. No.: 16/388,400

(22) Filed: Apr. 18, 2019

(65) Prior Publication Data
US 2020/0033458 A1 Jan. 30, 2020

Related U.S. Application Data

(60) Provisional application No. 62/711,260, filed on Jul. 27, 2018.

(51) Int. Cl.
*G01S 7/00* (2006.01)
*G01S 7/497* (2006.01)
*G01S 7/51* (2006.01)
*G01S 7/481* (2006.01)

(52) U.S. Cl.
CPC .......... *G01S 7/497* (2013.01); *G01S 7/4814* (2013.01); *G01S 7/51* (2013.01)

(58) Field of Classification Search
USPC ..................................... 356/4.01
See application file for complete search history.

(56) References Cited

U.S. PATENT DOCUMENTS

| | | | |
|---|---|---|---|
| 6,694,283 B2 * | 2/2004 | Alfano | G06T 7/70 |
| | | | 702/150 |
| 6,859,275 B2 | 2/2005 | Fateley et al. | |
| 7,106,435 B2 | 9/2006 | Nelson | |
| 7,324,196 B2 | 1/2008 | Goldstein et al. | |
| 7,538,872 B1 | 5/2009 | Butler et al. | |
| 7,627,171 B2 * | 12/2009 | Hampshire, II | G06T 7/194 |
| | | | 382/173 |
| 8,130,368 B2 * | 3/2012 | Eno | G01S 17/89 |
| | | | 356/3.01 |
| 8,284,279 B2 * | 10/2012 | Park | G06V 10/143 |
| | | | 348/266 |
| 8,295,548 B2 | 10/2012 | Banerjee et al. | |

(Continued)

FOREIGN PATENT DOCUMENTS

EP 2485064 A1 8/2012
WO 20170147206 A1 8/2017

OTHER PUBLICATIONS

PCT International Search Report and Written Opinion completed Nov. 5, 2019 and issued in connection with PCT/US2019/043146.

(Continued)

*Primary Examiner* — James R Hulka
(74) *Attorney, Agent, or Firm* — Barnes & Thornburg LLP

(57) ABSTRACT

A laser safety system adapted to prevent inadvertent illumination of people and assets. The laser safety system configured to emit a laser beam with a laser and determine a path of a target object relative to the laser safety system. The laser safety system configured to cause the laser beam to illuminate the target object while the target object moves along the path.

20 Claims, 7 Drawing Sheets

(56) References Cited

U.S. PATENT DOCUMENTS

| | | | |
|---|---|---|---|
| 10,185,027 B2* | 1/2019 | O'Keeffe | G01S 17/10 |
| 2002/0057431 A1* | 5/2002 | Fateley | G01J 3/2846 |
| | | | 356/330 |
| 2003/0225546 A1 | 12/2003 | Alfano et al. | |
| 2004/0184033 A1* | 9/2004 | Nelson | G01J 3/2823 |
| | | | 356/302 |
| 2004/0236229 A1 | 11/2004 | Freeman et al. | |
| 2005/0002572 A1 | 1/2005 | Saptharishi et al. | |
| 2007/0242229 A1 | 10/2007 | Kim et al. | |
| 2007/0296969 A1* | 12/2007 | Goldstein | G01J 3/14 |
| | | | 356/328 |
| 2009/0052288 A1 | 2/2009 | Eno et al. | |
| 2010/0073504 A1 | 3/2010 | Park et al. | |
| 2010/0322480 A1* | 12/2010 | Banerjee | G06V 10/143 |
| | | | 382/103 |
| 2013/0016514 A1 | 1/2013 | Stacey et al. | |
| 2017/0359554 A1 | 12/2017 | Madhav et al. | |
| 2018/0088214 A1 | 3/2018 | O'Keeffe | |

OTHER PUBLICATIONS

Supplementary European Search Report issued in connection with EP Appln. No. 19842158.8 and mailed from the European Patent Office dated Jul. 30, 2021.

Wilson K et al: "Plan for Safe Laser Beam Propagation from the Optical Communications Telescope Laboratory", Internet Citation, Feb. 15, 2003 (Feb. 15, 2003), pp. 1-17.

Biswas Abhijit et al: "OCTL Laser Beam Transmission Interruptions due to Aircraft and Predictive Avoidance", IPN Progress Report 42-191, Nov. 15, 2012 (Nov. 15, 2012).

* cited by examiner

LASER SAFETY SYSTEM

CROSS REFERENCE TO RELATED APPLICATIONS

This application claims priority to and the benefit of U.S. Provisional Patent Application No. 62/711,260, filed 27 Jul. 2018, the disclosure of which is now expressly incorporated herein by reference.

GOVERNMENT LICENSE RIGHTS

This invention was made with government support under Contract Numbers FA9451-12-F-0127 and SC-1144A-06 awarded by the Department of the Air Force and Contract Numbers FA9451-17-C-083 and SC-1717A-03 awarded by the Air Force Materiel Command. The government has certain rights in this invention.

FIELD OF THE DISCLOSURE

The present disclosure relates generally to use of lasers and more specifically to laser systems adapted to prevent inadvertent illumination of people and assets.

BACKGROUND

Some laser applications use lasers that may be hazardous to people, structures, machinery, aircraft, and satellites. For example, such applications may include: laser ranging, laser imaging, lidar, ladar, and laser weapons. These applications may present risks to people and assets.

SUMMARY

The present disclosure may comprise one or more of the following features and combinations thereof.

A laser system may include a laser, a laser mount, a sensor, and a controller. The laser may be configured to emit a laser beam. The laser mount may be coupled with the laser to support the laser thereon. The laser mount may be configured to move the laser relative to an axis to cause the laser beam to illuminate a target first object while the target first object moves relative to the laser. The sensor may be configured to generate data indicative of a location of a second object relative to the laser. The controller may be configured to block the laser from illuminating the second object with the laser beam.

In some embodiments, the controller may be configured to determine a path of the target first object relative to the laser. The controller may be configured to generate instructions to move the laser mount to cause the laser beam to illuminate the target first object while the target first object moves along the path of the target first object.

In some embodiments, the controller may be configured to detect the second object based on the data received from the sensor. The controller may be configured to determine a path of the second object relative to the laser based on the data received from the sensor.

In some embodiments, the controller may be configured to determine if the second object would be illuminated by the laser beam based on the path of the first target object and the path of the second object. The controller may be configured to generate instructions to block the laser from emitting the laser beam before the laser beam illuminates the second object if the controller determines the laser beam would illuminate the second object.

In some embodiments, determining if the second object will be illuminated by the laser beam based on the path of the first target object and the path of the second object may include applying a first factor of safety zone around the first target object, applying a second factor of safety zone around the second object, and determining if the first factor of safety zone will overlap the second factor of safety zone based on the path of the first target object and the path of the second object In some embodiments, the controller may be further configured to determine if the laser beam will no longer illuminate the second object based on the path of the first target object and the path of the second object. The controller may be configured to generate instructions to cause the laser to emit the laser beam if the laser beam will no longer illuminate the second object.

In some embodiments, the controller may be configured to identify the second object. The controller may be configured to generate the instructions to block the laser from emitting the laser beam if the controller i) identifies the second object as being an object included in a predetermined set of objects and ii) determines that the laser beam will illuminate the second object. In some embodiments, the predetermined set of objects may include people, satellites, and vehicles.

In some embodiments, the controller may be further configured to generate instructions to cause the laser mount to move such that the laser beam would illuminate the target first object while the target first object moves along the path of the target first object if the laser beam was being emitted.

In some embodiments, the sensor may be configured to receive telemetry data from the second object. The sensor may be configured to detect the second object and determine the path of the second object relative to the laser based on the telemetry data. In some embodiments, the sensor may be one of a radio wave sensor, acoustic sensor, optical sensor, and telemetry data sensor.

In some embodiments, the laser system may further include a user interface. The user interface may be configured to receive location data indicative of the location of the second object from an operator of the laser system. The controller may be configured to determine the path of the second object based at least in part on the data received from the user interface.

In some embodiments, the laser system may further include a user interface configured to receive inhibit region data indicative of a 2D or 3D space around the laser from a user. The controller may be configured to generate instructions to block the laser from emitting the laser beam into the 2D or 3D space based on the inhibit region data.

In some embodiments, the laser system may further include a user interface configured to receive allow region data indicative of a 2D or 3D space around the laser from a user. The controller may be configured to generate instructions to allow the laser to emit the laser beam only in the 2D or 3D space based on the allow region data.

In some embodiments, the laser may include an optical cavity. In some embodiments, the instructions to block the laser from emitting the laser beam before the laser beam illuminates the second object may include instructions to reduce a Q factor of the optical cavity.

In some embodiments, the laser includes a faraday rotator switch. The faraday rotator switch may be configured to reduce the Q factor of the optical cavity. In some embodiments, the instructions to block the laser from emitting the laser beam before the laser beam illuminates the second object includes reducing electric power to the laser.

In some embodiments, the laser may include capacitors, a fan, and a cooler. In some embodiments, the instructions to block the laser from emitting the laser beam before the laser beam illuminates the second object may not cause all electrical power to be removed from the capacitors, the fan, and the cooler.

According to the present disclosure, a method may include a number of steps. The method may include emitting a laser beam with a laser. The method may include determining a path of a target first object relative to the laser, moving the laser to cause the laser beam to illuminate the target first object while the target first object moves along the path of the target first object, detecting a second object, determining a path of the second object relative to the laser, and blocking the laser beam from illuminating the second object before the laser beam illuminates the second object if the laser beam would illuminate the second object based on the path of the first target object and the path of the second object.

In some embodiments, the method may include determining the path of the second object relative to the laser is based on telemetry data received from the second object.

In some embodiments, blocking the laser beam may include reducing a Q factor of an optical cavity of the laser. In some embodiments, blocking the laser beam may include blocking the laser from emitting the laser beam.

In some embodiments, determining the path of the second object relative to the laser may include a number of steps. The determining the path of the second object relative to the laser may include determining a first position of the second object, determining a second position of the second object after determining the first position of the second object, and determining a third position of the second object based on the first position and the second position.

According to the present disclosure, a laser system may determine if hazardous conditions exist and signal the laser system so that the laser may be turned off, thereby mitigating these risks, in response to determining that hazardous conditions exist. The laser system may monitor the direction of the laser beam relative to people and objects on the ground, in the air, and in space. It may determine if an unsafe condition exists, and send a signal to the laser system to turn off. The system may predict if an unsafe condition will occur in the future, and signal the laser system to turn off before the hazardous condition occurs.

In some embodiments, the system may provide for laser Inhibit ("no-fire") regions defined in both 2-D horizon coordinates (e.g. azimuth and elevation) and in 3-D geodetic coordinates (e.g. latitude, longitude, and altitude). In some embodiments, the system may provide for laser Allow ("clear-to-fire") regions defined in both 2-D horizon coordinates (e.g. azimuth and elevation) and in 3-D geodetic coordinates (e.g. latitude, longitude, and altitude).

In some embodiments, the laser system may protect moving people and assets; this may use radar, telemetry, or calculated positions versus time. It may provide protection for ground vehicle, aircraft, and Earth orbiting satellites. The laser system may protest people and assets on the ground, in the air, or in space.

According to aspects of the present disclosure, a general-purpose laser safety system (LSS) may provide for operation of laser systems in the outdoors. As an illustrative example, the LLS may be used in conjunction with a laser-based counter UAS system. This example Laser safety system may comprise a Safety Computer Module (SCM) and a Fail-safe Interlock Module (FIM). The safety computer module may perform the geometric calculations to determine where the beam hazard is in absolute space. If a hazardous condition exists, a signal may be sent to the fail-safe system which, in turn, signals to the laser system to turn off the laser(s).

The SCM may determine whether it is safe to use the laser based on inputs from the laser system and from LSS configuration information. These inputs may include azimuth and elevation information from a gimbal, tracking mount, or other pointing systems and system laser system status information.

The inputs may include system status information, inertial orientation data such as: roll, pitch, and yaw (or heading). The inputs may include navigation data such as; latitude, longitude, and altitude.

The inputs may include real-time airspace data that provides the position and velocity of nearby aircraft. This data may include information collected by: radar, telemetry, ADS-B or other real-time data sources. The inputs may include information on the location of satellites in Earth orbit. The inputs may include time and date information.

In the illustrative example, the inputs are used by the SCM to determine if the laser beam would impinge on a person or object that is susceptible to the laser. If this occurs, a signal is sent from the SCM to the FIM, causing the fail-safe system to signal the laser system to turn off the lasers. This calculation may be predictive based on the direction and motion of the laser beam and the location and motion of objects to be avoided.

Illustratively, all signals into and out of the SCM use UDP/IP messages. In some embodiments, this system is used on a moving platform, such as a truck, aircraft, or spacecraft.

In some embodiments, this system is controlled by a user, run completely autonomously, or a combination of both. In some embodiments, this system is used under water on a fixed or moving platform.

In some embodiments, this system is integrated into a weapon system. In some embodiments, this system is integrated into a laser imaging system. In some embodiments, this system is integrated into a laser communications system.

In some embodiments, this system is integrated into a LIDAR system. In some embodiments, this system is integrated into a LADAR system. In some embodiments, this system includes a Graphical User Interface (GUI). In some embodiments, this system includes a remote GUI operated over a Wide Area Network (WAN). In some embodiments, this system provides real-time situational awareness data over a WAN.

In some embodiments, the LSS is integrated into a 2D or 3D Situational Awareness (SA) display. This SA may incorporate terrain height and other a-priori data.

In some embodiments, the LSS provides an override function so that an operator could prevent the LSS from using certain types of data in the hazard calculation. This could include data on: terrain, aircraft, space objects, or predefined 2D and 3D hazard regions.

These and other features of the present disclosure will become more apparent from the following description of the illustrative embodiments.

DETAILED DESCRIPTION OF THE DRAWINGS

Figure 1:
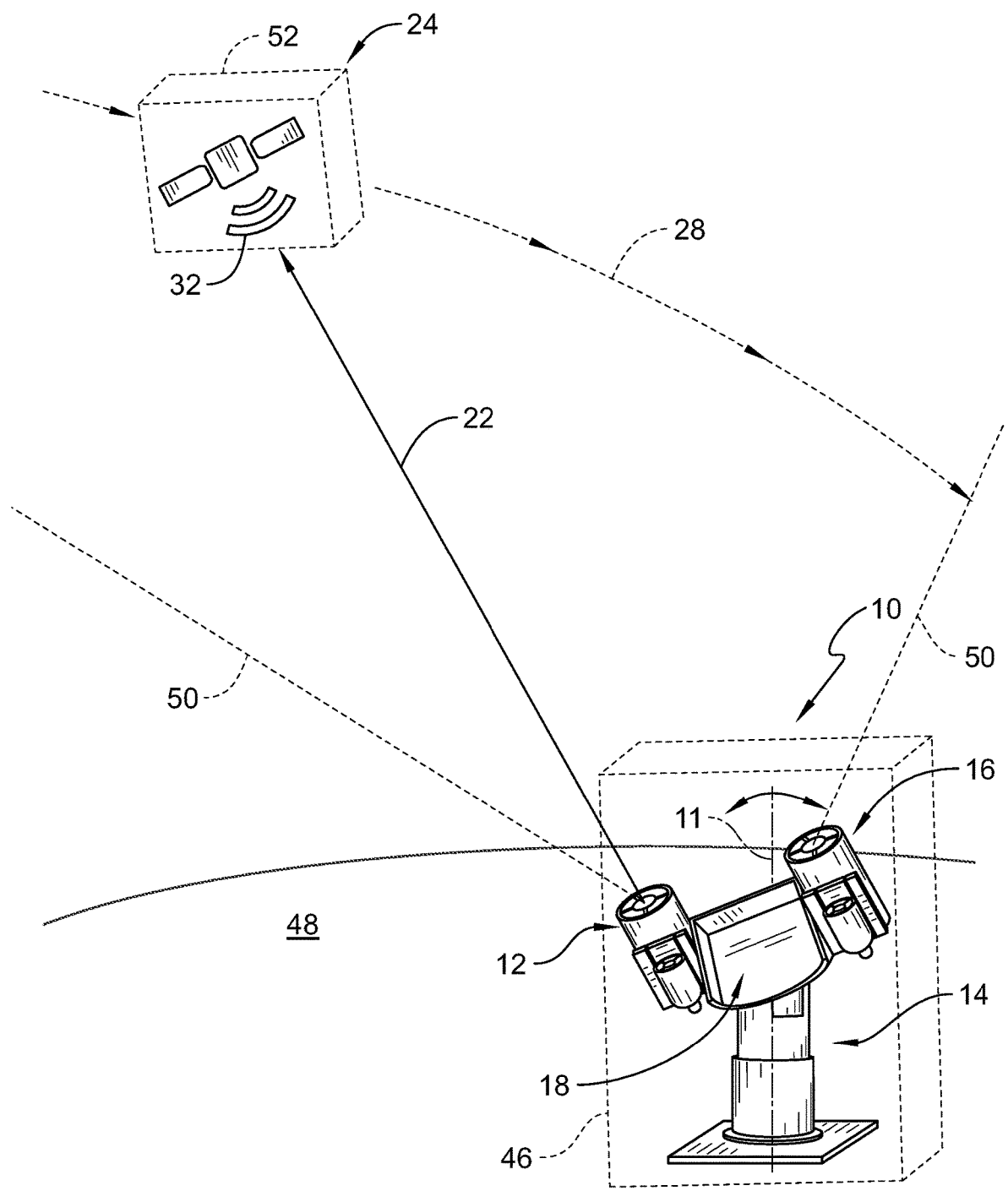
FIG. 1 is a view of a laser system according to the present disclosure that is adapted for monitoring the position of a target object using a laser as the target object moves relative to the laser system.

For the purposes of promoting an understanding of the principles of the disclosure, reference will now be made to a number of illustrative embodiments illustrated in the drawings and specific language will be used to describe the same.

A laser system 10 according to the present disclosure is configured to monitor illumination of a laser beam 22 and prevent inadvertent illumination of people and assets with the laser beam 22 as suggested in FIGS. 1-7. The laser system 10 illustratively includes a laser 12, a laser mount 14, a sensor 16, a controller 18, and a user interface 20 as shown in FIGS. 1-6.

The laser 12 is configured to emit a laser beam 22. The laser mount 14 is coupled with the laser 12 to support the laser 12 thereon and is configured to move the laser 12 relative to an axis 11 to cause the laser beam 22 to illuminate a target first object 24 while the target first object 24 moves relative to the laser 12. The laser mount 14 is configured to orient the laser 12 in 360 degrees of rotation in the illustrative embodiment. The sensor 16 is configured to generate data indicative of a location of a second object 26 relative to the laser 12 and, in some embodiments, the target first object 24 in real time. The controller 18 generates instructions to block the laser 12 from illuminating the second object 26 with the laser beam 22 if a path 30 of the second object 26 would cause the second object 26 to be illuminated. The user interface 20 is configured to receive data indicative of the location of the second object 26 and other situational information from an operator or a user of the laser system 10 as suggested in FIG. 6.

In determining if the controller 18 should block the laser 12 from illuminating the second object 26 with the laser beam 22, the controller 18 is configured to do several functions. The controller 18 is configured to determine a path 28 of the target first object 24 relative to the laser 12 and generate instructions to move the laser mount 14. The laser mount 14 is moved to cause the laser beam 22 to illuminate the target first object 24 while the target first object 24 moves along the path of the target first object 24.

The path 28 of the target first object 24 is determined by the controller 18 by signals received from the sensor 16 in some embodiments as suggested in FIG. 1. The target first object 24 includes a satellite in the illustrative embodiment. The sensor 16 includes at least one of an optical sensor, radar, wifi, internet connection, user interface 20, and an acoustic sensor. An optical sensor may be a video or image camera, photodiode, or other device configured to detect visible light.

The path 28 of the target first object 24 is determined by the controller 18 receiving telemetry data from the target first object 24 in some embodiments. The path 28 of the target first object 24 is determined by the controller 18 by taking data from a look up table of a path of the target first object 24 in some embodiments. For example, the look up table could be provided by the government or a customer such as in satellite path data. The look up table could be stored in the controller 18 or accessed by the controller 18 via the internet or other connection. The path 28 of the target first object 24 is determined by comparing images or video of the target first object 24 in some embodiments.

The controller 18 includes memory and a processor. The controller 18 is configured to detect the second object 26 based on the data received from the sensor 16 and determine a path 30 of the second object 26 relative to the laser 12 based on the data received from the sensor 16. The controller 18 is configured to determine if the second object 26 would be illuminated by the laser beam 22 based on the path 28 of the first target object 24 and the path 30 of the second object 26 as suggested in FIG. 2. For example, the controller 18 determines if the path 30 will cross in front of the path 28 at a time when the laser beam 22 would be illuminating that part of space.

The path 30 of the second object 16 is determined by comparing images or video of the second object 26 in some embodiments. The path 30 of the second object 26 is determined by the controller 18 receiving telemetry data from the second object 26 in some embodiments. The path 30 of the second object 26 is determined by the controller 18 by taking data from a look up table of a path of the second object 26 in some embodiments. In some cases, the path 30 of the second object 26 is stationary, if the second object 26 is not moving relative to the target first object 24

If the controller 18 determines the laser beam 22 would illuminate the second object 26, then the controller 18 generates instructions to block the laser 12 from emitting the laser beam 22 before the laser beam 22 illuminates the second object 26. The laser beam 22 continues to illuminate the target first object 24 and collect data for a period of time after the controller 18 determines that the laser beam 22 would illuminate the second object 26 in the future so long as time permits before the laser beam 22 would illuminate the second object 26.

The path 28 of the target first object 24 and the path 30 of the second object 26 are updated in real time. As such, the laser system 10 may determine that the second object 30 will be illuminated in the future at a first instance in time and generate instructions in response to the termination to block emission of the laser beam 22 near that future time. After more data is received from the sensor 16 at a second instance in time, the laser system 10 may determine the second object 30 will no longer be illuminated in the future by the laser beam 22 because the path 28 of the second object 30 has changed since the first instance in time. The controller 18 then ignores or deletes the instructions to block the emission of the laser beam 22 and allows the laser beam 22 to be emitted at that future time.

In some conventional systems, a laser beam is blocked if the second object interrupts/is illuminated by the beam or if the second object interacts with a safety mechanism such as a second less powerful safety-trip laser beam being emitted. Such systems are reactive and react to the hazard being already present. The present disclosure is preemptive and determines a hazard could happen in the future and takes steps to avoid the hazard by blocking the laser beam 22 before it may be hazardous to the second object.

The instructions to block the laser 12 from emitting the laser beam 22 before the laser beam 22 illuminates the second object 26 include blocking the laser 12 from emitting the laser beam 22 about 10 seconds or less before the laser beam 22 illuminates the second object 26 in some embodiments. The instructions include blocking the laser 12 from emitting the laser beam 22 about 5 seconds or less before the laser beam 22 illuminates the second object 26 in some embodiments. The instructions include blocking the laser 12 from emitting the laser beam 22 about 2 seconds or less before the laser beam 22 illuminates the second object 26 in some embodiments. The instructions include blocking the laser 12 from emitting the laser beam 22 about 1 second or less before the laser beam 22 illuminates the second object 26 in some embodiments. The instructions include blocking the laser 12 from emitting the laser beam 22 about 0.5 seconds or less before the laser beam 22 illuminates the second object 26 in some embodiments. The instructions include blocking the laser 12 from emitting the laser beam 22 about 0.1 seconds or less before the laser beam 22 illuminates the second object 26 in some embodiments.

Additionally, the controller 18 is also configured to determine if the laser beam 22 will no longer illuminate the second object 26 based on the path 28 of the first target object 24 and the path 30 of the second object 26. Based on these determinations, the controller 18 is configured to generate instructions to cause the laser 12 to emit the laser beam 22, if the laser beam 22 will no longer illuminate the second object 26. The controller 18 generates instructions to cause the laser mount 14 to move such that the laser beam 22 would illuminate the target first object 24 while the target first object 24 moves along the path 28 if the laser beam 22 was being emitted so that the laser 12 is oriented to aim the laser beam 22 at the target first object 24 once the laser beam 22 is re-emitted from the laser 12.

Moreover, the laser 12 blocks the laser beam 22 or shuts down in a non-hard shutdown mode so that the laser beam 22 may be emitted by the laser 12 faster than if the laser 12 was shut down urgently/hard shut down. For example, the laser 12 is configured to emit the laser beam 22 within 1 second or less after blocking the laser beam 22 in some embodiments. The laser 12 is configured to emit the laser beam 22 within 0.5 seconds or less after blocking the laser beam 22 in some embodiments. The laser 12 is configured to emit the laser beam 22 within 0.3 seconds or less after blocking the laser beam 22 in some embodiments. The laser 12 is configured to emit the laser beam 22 within 0.2 seconds or less after blocking the laser beam 22 in some embodiments. The laser 12 is configured to emit the laser beam 22 within 0.1 seconds or less after blocking the laser beam 22 in some embodiments. The laser 12 is configured to emit the laser beam 22 within 0.05 seconds or less after blocking the laser beam 22 in some embodiments. The laser 12 is configured to emit the laser beam 22 within 0.01 seconds or less after blocking the laser beam 22 in some embodiments. The laser 12 is configured to emit the laser beam 22 within 0.008 seconds or less after blocking the laser beam 22 in some embodiments. The laser 12 is configured to emit the laser beam 22 within 0.005 seconds or less after blocking the laser beam 22 in some embodiments. The laser 12 is configured to emit the laser beam 22 within 0.001 seconds or less after blocking the laser beam 22 in some embodiments.

The controller 18 is configured to block the laser 12 from emitting the laser beam 22 if the controller 18 determines that the laser beam 22 would illuminate the second object 26 to protect the second object 26 from the harmful effects of the high-power laser 12. The controller 18 is configured to identify the second object 26 from a predetermined set of objects in some embodiments. The predetermined set of objects may include, people, satellites, vehicles, buildings, birds, flying toys, etc.

The controller is also configured to generate the instructions to block the laser 12 from emitting the laser beam 22 if the controller 18 identifies the second object 26 as being an object included in a predetermined set of objects and determines that the laser beam 22 will illuminate the second object 26. The controller 18 generates instructions to block the laser beam 22 if the second object 26 is identified as being a person, satellite, vehicle, or building in some embodiments. The controller 18 does not generate instructions to block the laser beam 22 if the second object 26 is an animal such as a bird in some embodiments.

The second object 26 may be identified by comparing sensed data of the second object 26 over time intervals. For example, if the second object 26 is moving in a sporadic motion, the controller 18 may determine the second object 26 is a bird. The controller 18 may consider color of the second object 26, differences between colors/brightness in different frames of images of the second object 26 (periodic change may indicate a rotor or machine having a set speed), motion (including velocity and acceleration) of the second object 26, sounds of the second object 26, size of the second object 26, location of the second object 26, etc.

Figure 5:
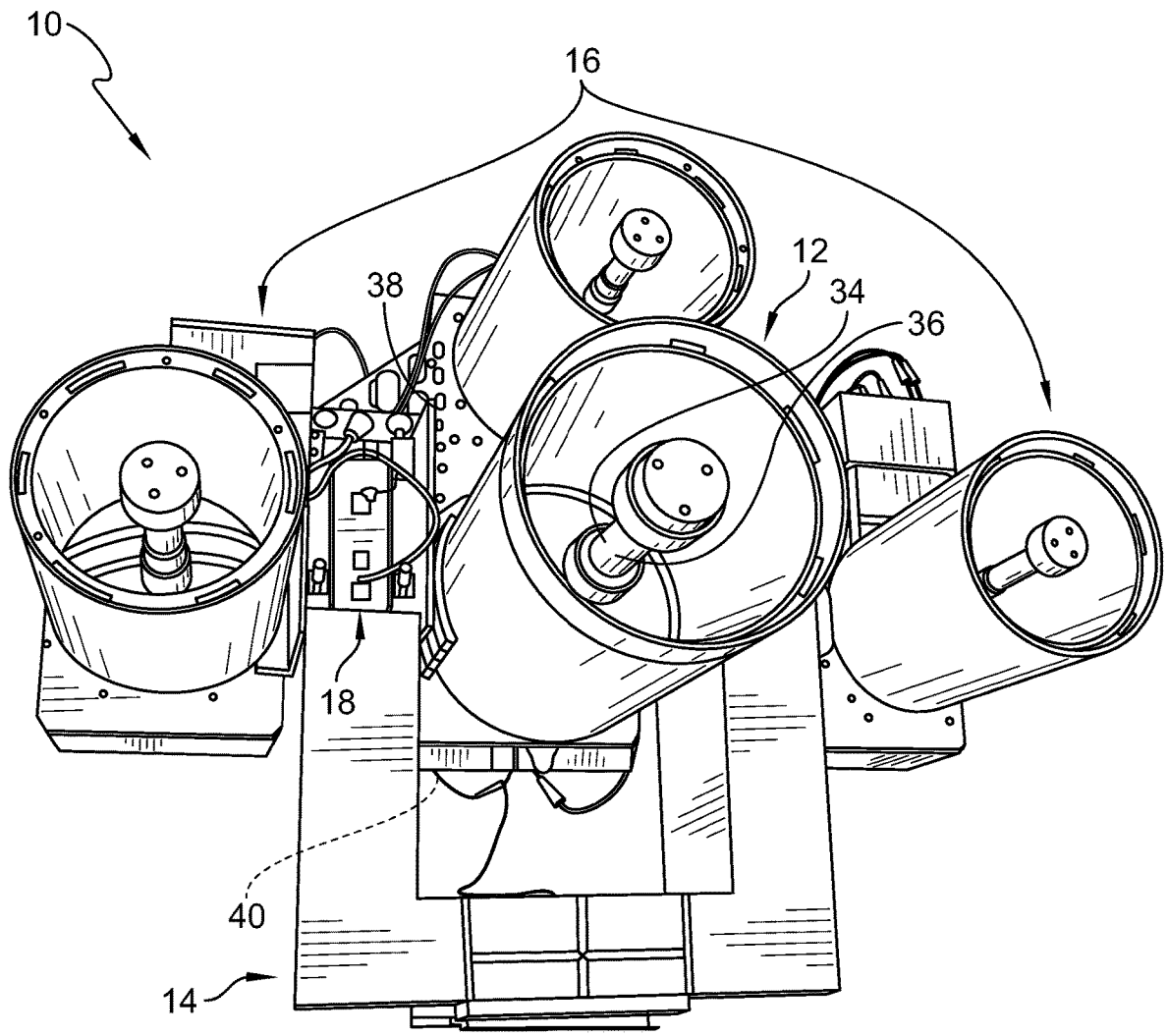
FIG. 5 is another view of the laser system of FIG. 1 showing that the laser system includes a laser, a laser mount for mounting and movement of the laser, and the sensor configured to detect objects around the laser system.

The laser 12 includes an optical cavity 34, a faraday rotator switch 36, capacitors 38, a fan 40, and a cooler 42 as shown in FIG. 5. The optical cavity 34 emits the laser beam 22. The faraday rotator switch 36 is configured to reduce a Q factor of the optical cavity 34.

The laser 12 also includes instructions to block the laser 12 from emitting the laser beam 22 before the laser beam 22 illuminates the second object 26. The instructions to block the laser 12 from emitting the laser beam 22 includes instructions to reduce the Q factor of the optical cavity 34 in some embodiments. The instructions to block the laser 12 from emitting the laser beam 22 before the laser beam 22 illuminates the second object 26 includes reducing electric power to the laser 12 in some embodiments. However, the instructions to block the laser 12 from emitting the laser beam 22 do not cause all electrical power to be removed from the capacitors 38, the fan 40, and the cooler 42. As such, the laser 12 is not powered down in a hard shutdown, but is in a standby mode that allows for quick re-emission of the laser beam 22.

In some instances, the instructions to block the laser 12 from emitting the laser beam 22 may include a soft shutdown wherein the resonance or Q factor is reduced or stopped in the optical cavity 34 of the laser 12 by switching the faraday rotator switch 36. Such a soft shutdown prevents wear and tear on the laser 12 and prevents damage to the optical cavity 34.

In other instances, the instruction to block the laser 12 from emitting the laser beam 22 before the laser beam 22 illuminates the second object 26 includes instructions to obstruct the laser beam 22 with a physical material obstruction. A shutter may be used to block or reflect the laser beam 22 back into the laser 12.

In other instances, the instruction to block the laser 12 from emitting the laser beam 22 before the laser beam 22 illuminates the second object 26 includes completely shutting down the laser 12. Shutting down the laser 12 may only be used in emergency situations, such as when a person or other predetermined object is actively blocking the laser beam 22 within the space 48 about the laser system 10.

Complete shutdown of the laser 12 may use a longer reboot time than a soft shutdown. After a complete shutdown, the laser 12 may use over 10 seconds to reboot and come back online to a point in which the laser beam 22 may be emitted. In contrast, a controlled shutdown of the capacitors or a reduction in the Q factor of the optical cavity 34 may take only milliseconds for rebooting or start up. In some cases startup of the laser 12 may be less than 1 second after a soft shutdown.

The controller 18 and the sensor 16 are electronically coupled so that the data collected from the sensor 16 is received by the controller 18. The connection between the sensor 16 and the controller 18 may be wired or may be wireless. The controller 18 is configured to determine the path 30 of the second object 26 based at least in part on the data received from the sensor 16.

In the illustrative embodiments, the sensor 16 is a telemetry data sensor 16 and configured to receive telemetry data 32 from the second object 26. The telemetry data 32 allows the sensor 16 to detect the second object 26 and determine the path 30 of the second object 26 relative to the laser 12 based on the telemetry data 32.

Figure 2:
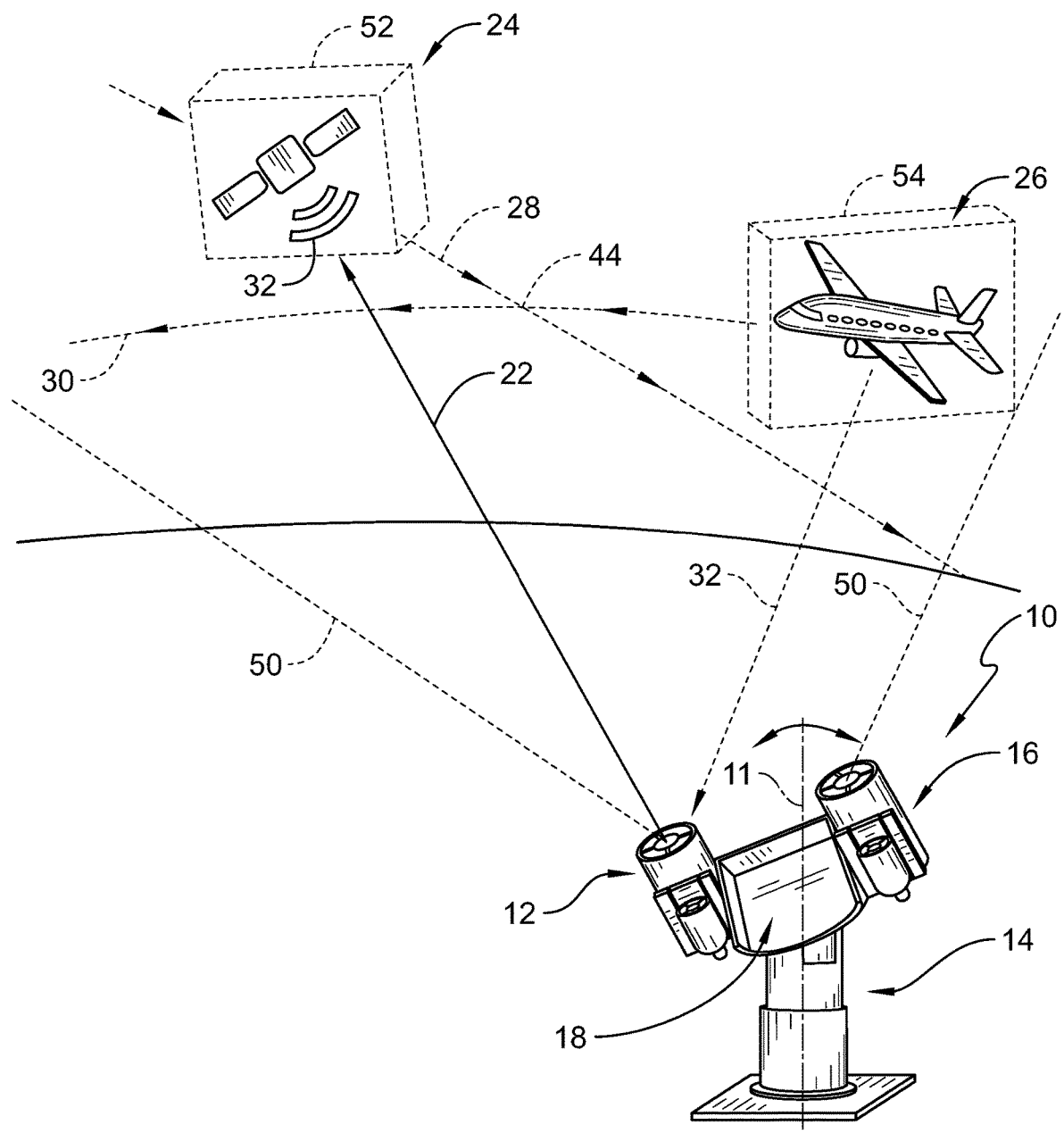
FIG. 2 is another view of the laser system of FIG. 1 showing that the laser system includes a sensor and controller for monitoring and preventing inadvertent illumination of other objects that may cross paths with the target object such as an airplane.

In the illustrative embodiment of FIG. 2, the sensor telemetry data 32 includes airplane coordinates sent by an aircraft 26 or radar. The aircraft 26 emits the telemetry data 32 that is collected by the sensor 16. The target first object 24 may also emit telemetry data 32 that is received by the telemetry sensor 16.

Figure 4:
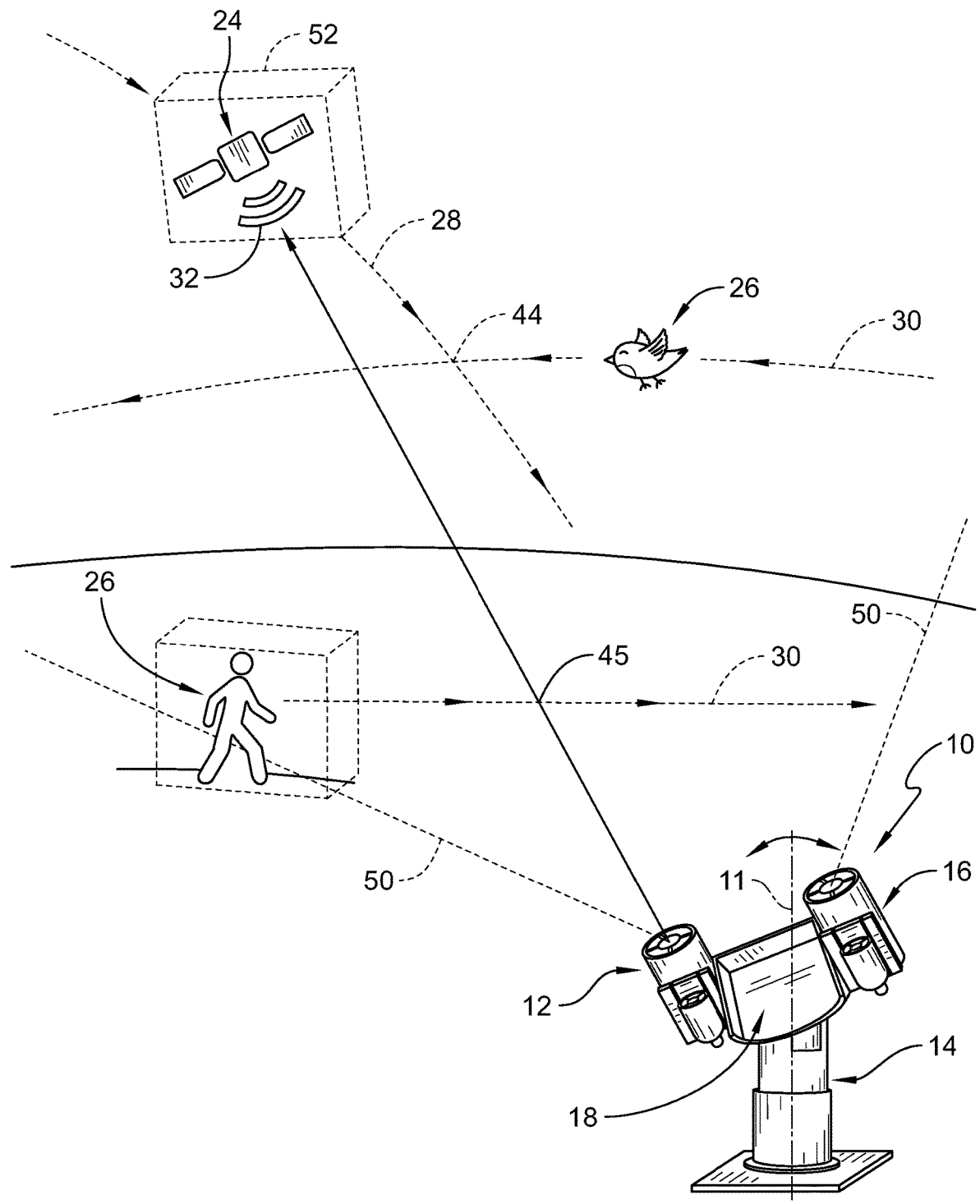
FIG. 4 is another view of the laser system of FIG. 1 showing that the laser system includes the sensor and controller for monitoring and preventing inadvertent illumination of other objects that may cross in front of the laser such as people and animals.

The sensor 16 may be an optical sensor 16 and configured to receive optical data. Optical data allows the sensor to detect the location of the second object 26 and track the movement of the second object 26 by continuously updating the location of the second object 26 based on the optical data. Tracking the movement of the second object 26 also allows the controller 18 to predict or calculate a future position of the second object 26 along the path 30 and determine if the path 30 of the second object 26 intersects the target first object 24 at an intersection point 44 as seen in FIGS. 2 and 4. The optical sensor 16 may also be configured to determine if the path 30 of the second object 26 causes the second object 26 to be illuminated by the laser beam 22 at an intersection point 45 as seen in FIG. 4.

The controller 18 may also be configured to determine the type of object based on the tracked path 30 of the second object 26. By updating the position and tracking the movement of the second object 26 the controller 18 is configured to determine if the path 30 of the second object 26 is constant along the predicted path 30, or if the path 30 of the second object 26 is erratic along the predicted path 30. For instance, if the path 30 of the second object 26 is erratic and does not follow the predicted path 30 calculated by the controller 18, then the second object 26 may be a bird or other non-hazardous object like as shown in FIG. 4. Therefore, the controller 18 is configured to continue to allow the laser 12 to emit the laser beam 22 to illuminate the target first object 24 even if the second object 26 is or would become illuminated by the laser beam 22.

In other embodiments, the sensor 16 may be a radio wave sensor. In other instances, the sensor 16 may be an acoustic sensor.

Figure 3:
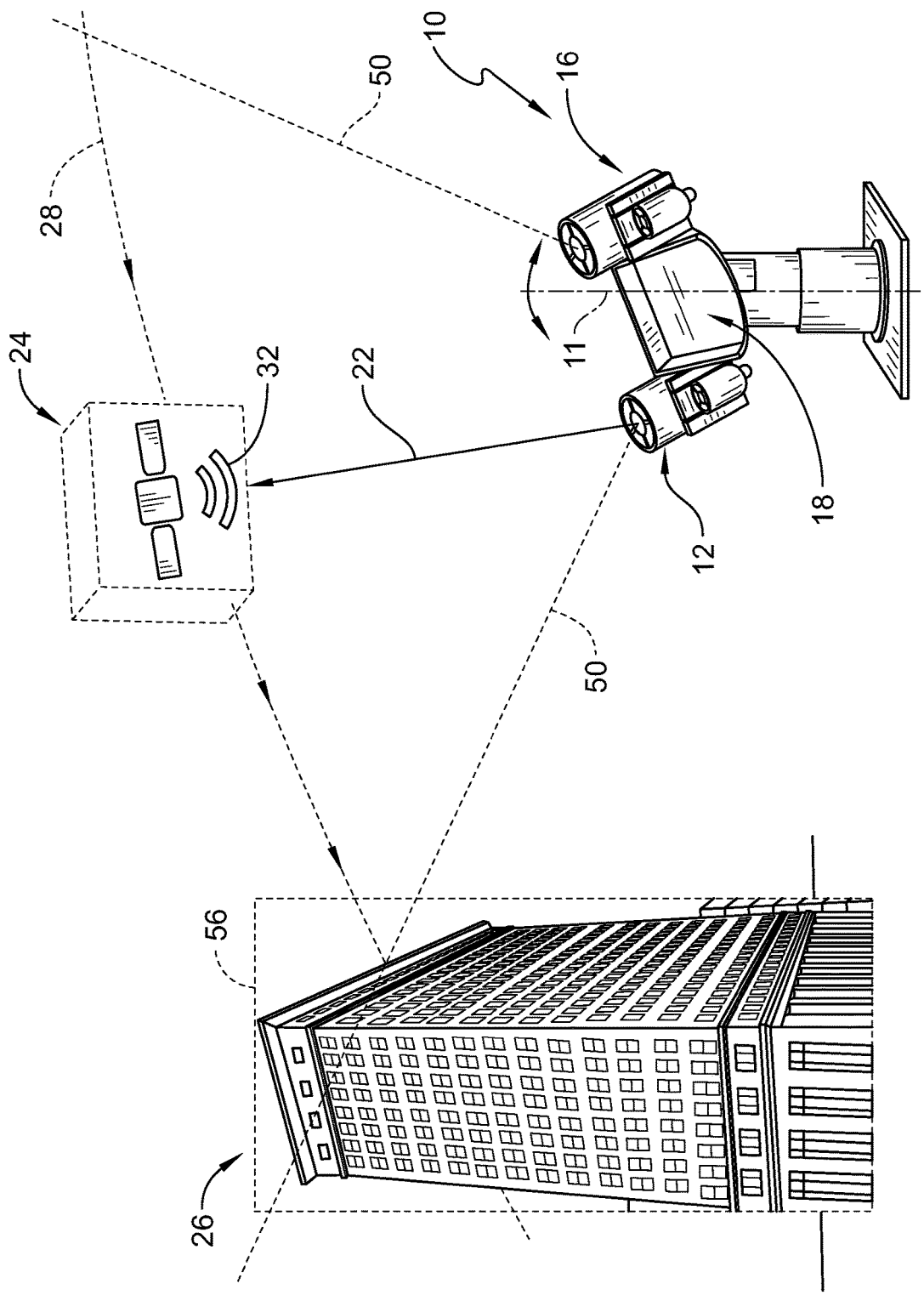
FIG. 3 is another view of the laser system of FIG. 1 showing that the laser system includes the sensor and controller for monitoring and preventing inadvertent illumination of other objects that may be located in the path of the target object such as a building.

The user interface 20 is configured to receive inhibit region data indicative of a 2D or 3D space 56 around the laser 12 from the user as suggested in FIG. 3. The controller 18 is configured to generate instructions to block the laser 12 from emitting the laser beam 22 into the 2D or 3D space 56 based on the inhibit region data.

The user interface 20 is also configured to receive allow region data indicative of a 2D or 3D space 46 around the laser 12 from the user as suggested in FIG. 1. The controller 18 is configured to generate instructions to allow the laser 12 to emit the laser beam 22 only in the 2D or 3D space 48 based on the allow region data. The user interface 20 may also be configured to determine the angle or view 50 of the optical sensor 16 based upon the allow region data so that the sensor 16 only detects objects 24, 26 in a specific area.

The controller 18 is configured to include safety factor data indicative of a first factor of safety zone 52 around the first target object 24 and a second factor of safety zone 54 around the second object 26 in some embodiments. In some embodiments, the safety factor data may be input from a user via the user interface 20. The controller 18 is configured to apply the first factor of safety zone 52 around the first target object 24, apply the second factor of safety zone 54 around the second object 26, and determine if the first factor of safety zone 52 will overlap the second factor of safety zone 54 based on the path 28 of the first target object 24 and the path 30 of the second object 26. The controller 18 is also configured to generate the instructions to block the laser 12 from emitting the laser beam 22 if the first factory of safety zone 52 and the second factor of safety zone 54 overlap. The safety zones 52, 54 overlapping is indicative that the laser beam 22 may illuminate the second object 26. A factor of safety zone may also be applied to the laser beam 22.

The user interface 20 is also configured to receive user input data indicative of a second object 26 from a user. The user may input environmental data indicative of a second object 26. In the illustrative embodiment of FIG. 3, the user interface 20 is also configured to receive environmental data indicative of a 2D or 3D space 58 around a stationary second object 26 such as a building from the user. The controller 18 is configured to generate instructions to block the laser 12 from emitting the laser beam 22 before the laser beam 22 illuminates the 2D or 3D space 58 based on the blocked region data.

In other embodiments, the user interface 20 received data indicative of the moving second object 26 like in FIG. 2. The user may input data to indicate to the system 10 that the second object 26 is in the angle of view 50 of the sensor 16 when the second object is not emitting the telemetry data 32. The user may also input data to the controller 18 to indicate that the second object 26 is one of the predetermined set of objects. The user may also input data to the controller 18 to indicate that the second object 26 is not a hazardous object such as a bird.

The user may also input system data about the first target object 24, such as orbit delays or system outages. The user interface 20 is configured to receive the system data from the user and the controller 18 is configured to generate instructions to block the laser 12 from emitting the laser beam 22 based on the system data. The controller 18 is configured to determine the path 30 or location of the second object 26 based at least in part on the data received from the user interface 20 in some embodiments.

A method of using the laser system 10 may include several steps. The method includes emitting the laser beam 22 with the laser 12 and determining the path 28 of a target first object 24 relative to the laser 12. The method further includes moving the laser 12 using the laser mount 14 to cause the laser beam 22 to illuminate the target first object 24 while the target first object 24 moves along the path 28 of the target first object 24.

The method also includes detecting the second object 26 and determining the path 30 of the second object 26 relative to the laser 12. The method further includes blocking the laser beam 22 from illuminating the second object 26 before the laser beam 22 illuminates the second object 26, if the laser beam 22 would illuminate the second object 26 based on the path 28 of the first target object 24 and the path 30 of the second object 26.

In the illustrative embodiment of FIG. 2, the method includes determining the path 30 of the second object 26 relative to the laser 12 based on telemetry data 32 received from the second object 26. In the illustrative embodiment of FIGS. 2 and 4, the method also includes determining the path 30 of the second object 26 relative to the laser 12 based on optical data received from the sensor 16 and calculating the future position of the second object 26. The method may also include determining the path 30 of the second object 26

The method the controller 18 blocks the laser beam 22 by reducing the Q factor of the optical cavity 34 of the laser 12. Reducing the Q factor of the optical cavity 34 of the laser 12 blocks the laser 12 from emitting the laser beam 22.

In the step of determining the path 30 of the second object 26 relative to the laser 12, the method also includes determining a first position of the second object 26, determining a second position of the second object 26 after determining the first position of the second object 26, and determining a third position of the second object 26 based on the first position and the second position. The determination of the first, second, and third positions of the second object 26 is used in calculating/predicting the movement of the second object 26 along the path 30.

Figure 6:
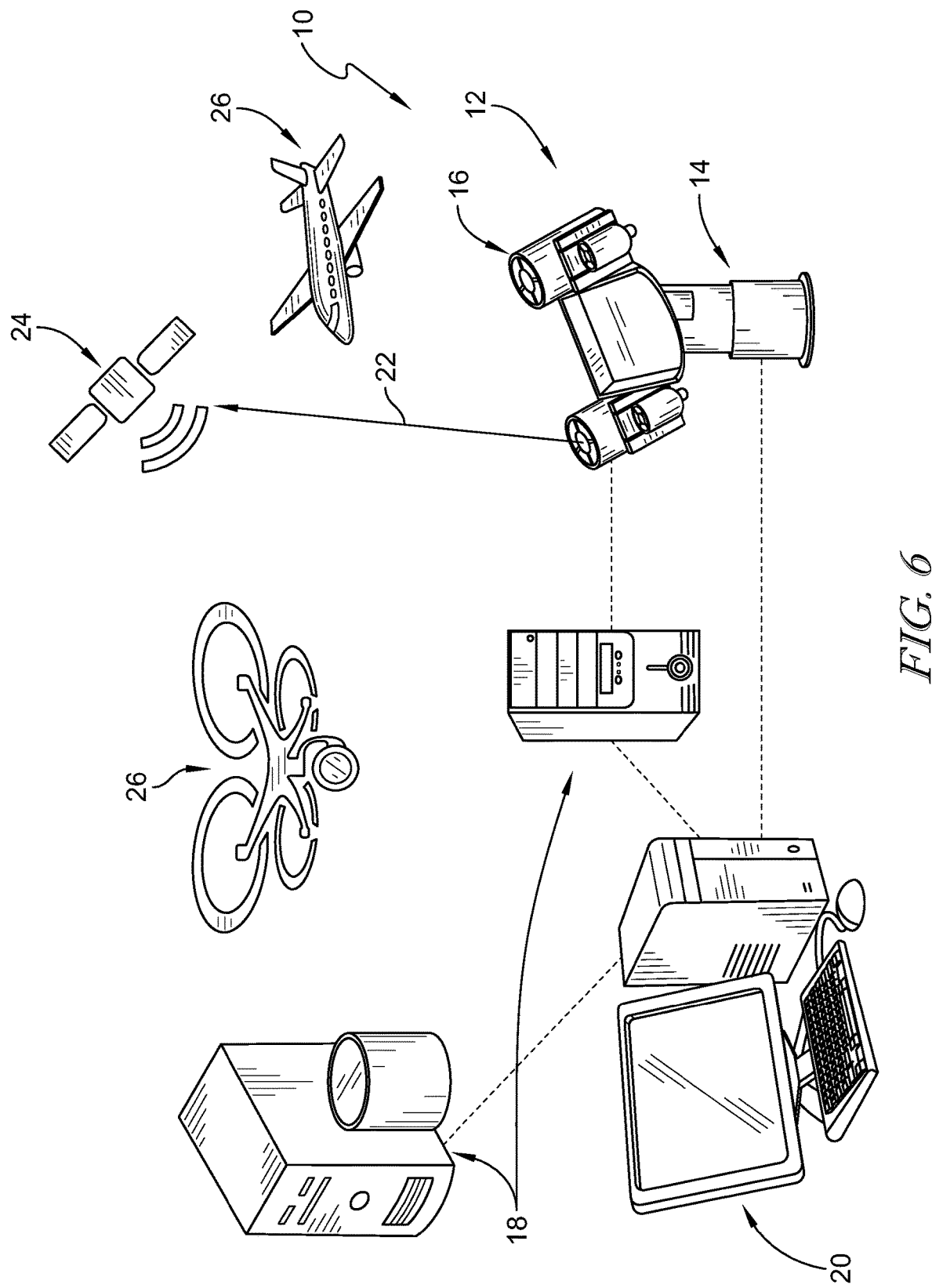
FIG. 6 is a diagrammatic view of an embodiment of the laser system.

Referring to FIG. 6, an illustrative embodiment of the laser safety system (LSS) 10 is shown. The illustrative laser system 10 is integrated with a laser counter UAS system. This laser system 10 is includes a safety computer module (SCM) and a Fail-safe Interlock Module (FIM). The safety computer module may incorporate a user interface 20, which includes: monitor, keyboard, mouse, game controller, or other human interface devices. The safety computer module collects laser beam 22 pointing direction and motion data from the laser counter-UAS system via a data connection. Data on the position and velocity of the aircraft 26; satellites 24; and other objects to be avoided are provided by an external server via a network connection in the illustrative embodiment.

The safety computer module uses the data collected via the connections to determine if it is safe to illuminate the target 24. If it is safe to emit the laser beam 22, then the SCM sends an allow signal to the fail-safe system via the connection. This signal is then relayed to the laser 12 via the connection allowing the laser beam to fire. If the condition is not safe, the safety computer module sends an Inhibit signal to the fail-safe system via the connection. The Inhibit signal is then relayed to the laser system 10 via the connection(s) preventing the laser 12 from firing.

In the illustrative embodiment, the Fail-Safe Interlock Module is a fail-safe system. Reference is hereby made to U.S. Pat. No. 9,659,418 issued May 23, 2017 and titled Locking Systems for disclosure relating to fail-safe systems, which patent is hereby incorporated in its entirety herein. In the event of a failure of the safety computer module 2; loss or corrupted data sent via connection; or failure of the fail-safe system 3; an Inhibit signal is sent to the laser system via connection.

The data connections may be hardwired or wireless; and may also use a satellite or lasercom link. These connections may also be encrypted.

Figure 7:
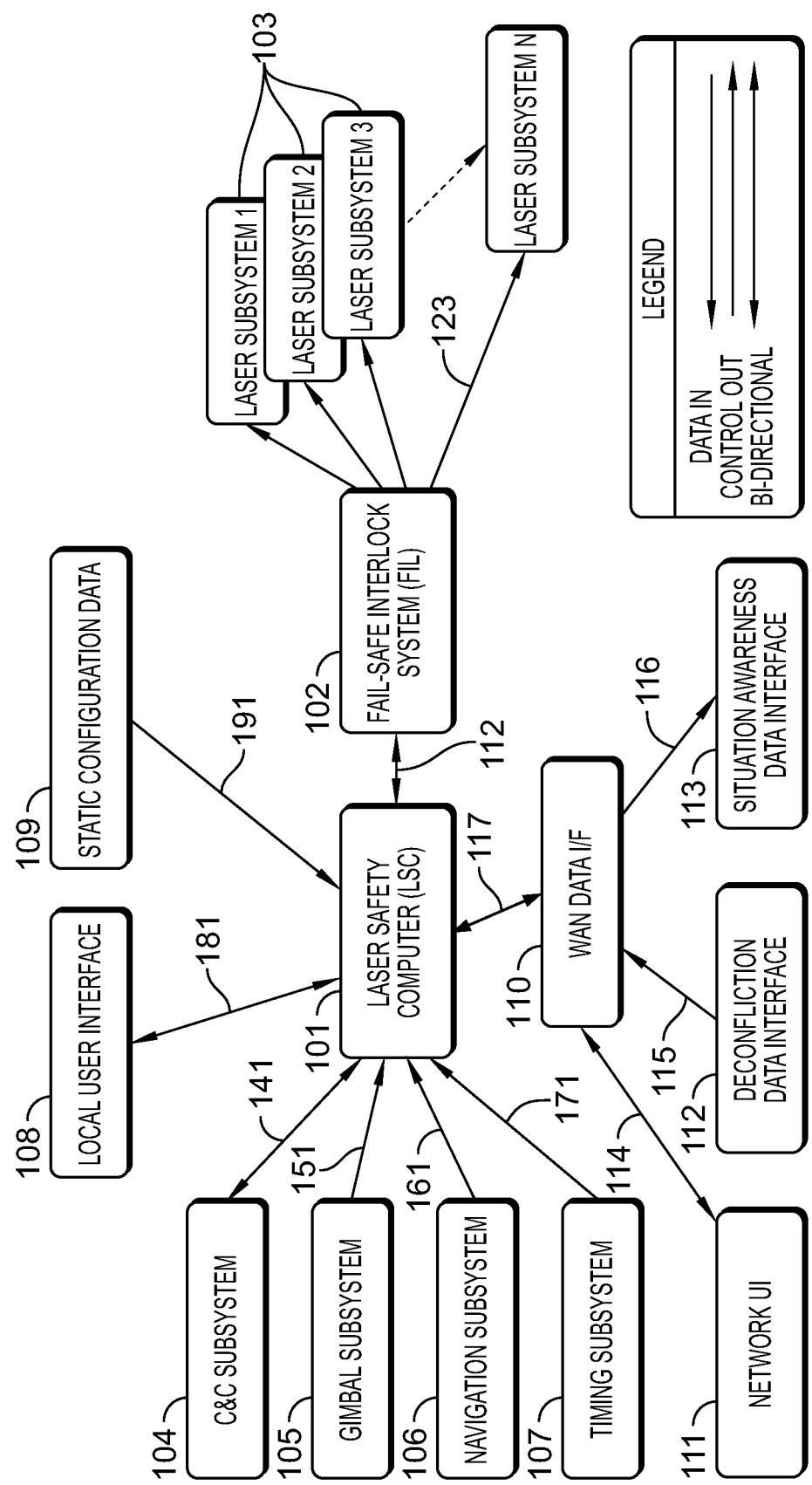
FIG. 7 is a diagrammatic view of a laser system in accordance with the present disclosure.

FIG. 7 illustratively depicts the data processing in the laser system 10 embodiment depicted in FIG. 6. Real Time (RT) data is collected by the safety computer module 101 from the laser system; this data may include: system status information via the laser system Command and Control subsystem 104; laser beam pointing information (azimuth-elevation) and system orientation information (roll-pitch-yaw) via the laser system gimbal subsystem 105; system position (latitude-longitude-altitude) from the Navigation subsystem 106; and date and time information from the Timing subsystem 107. Additional real time data may be acquired via the Wide Area Network (WAN) interface 110. This WAN may include an interface 115 to real time information on the location of aircraft and satellite that is not to be illuminated with the laser beam. The subsystems: 104, 105, 106, 107, and 110 are not part of the LSS in the illustrative embodiment, they are part of the laser counter UAS system. In the illustrative embodiment, the connections: 117, 141, 151, 161, and 171 utilize UDP/IP and may be wired or wireless. In other embodiments, these connections could use other hardware and software protocols.

The system may also use static system configuration information provided via a static configuration data interface 109. The safety computer module may be controlled by an operator via the Local User Interface 108. In the illustrative embodiment, both interfaces 108 and 109 are part of the safety computer module. Interface 108 is comprised of a monitor, keyboard, and mouse, and the connection 181 contains both video and USB links. In the illustrative embodiment the interface 109 is a file interface to a disk drive located on the SCM. In other embodiments, these interfaces may use other types of links.

The WAN 110 may also include a Remote User Interface 111 for configuration and control of the LSS. The WAN 110 may also include a Remote Situational Awareness Interface 113 to provide the LSS and counter-UAS system status information to a remote location.

The safety computer module 101 combines real time data collected via connections: 117, 141, 151, 161 with static configuration data from connection 191 along with user input from connection 181 or 111, and determines if it is safe to illuminate. In the illustrative embodiment, the safety computer module 101 outputs two types of signals to the fail-safe system 102 via the connection 112: Inhibit, if it is not safe to fire the laser, and Allow, if it is safe to fire the laser. Other embodiment may have more types of signals.

The fail-safe system 102 signals Inhibit or Allow to the lasers 103 via connection 123. In the illustrative embodiment the connection 123 is a fail-safe analog relay closure; if the relay is closed, it is safe and firing of the laser(s) is allowed. If the relay is open, it is unsafe and firing of the laser(s) is inhibited.

In the illustrative embodiment, the fail-safe system 102 controls multiple lasers independently. In other embodiments the laser control signals 123 may not be independent or there may only be one laser connected.

In this illustrative embodiment, the safety computer module 101 performs safety calculations based on whether the laser is pointing inside a predefined two-dimensional, azimuth and elevation region in the laser system gimbal azimuth-elevation reference frame. These predefined regions may be designated laser Inhibit or laser Allow areas. In other embodiments, the laser pointing may not be restricted to move only in azimuth and elevation directions (e.g. in a 3-axis gimbal).

In this illustrative embodiment, the safety computer module 101 performs safety calculations based on whether the laser is pointing inside a predefined absolute two-dimensional, azimuth and elevation regions in absolute horizon coordinates (e.g. relative to World Geodetic System 1984 (WGS84) horizon). These predefined regions may be designated laser Inhibit or laser Allow areas.

In this illustrative embodiment, the safety computer module 101 performs safety calculations based on whether the laser is pointing inside a predefined absolute three-dimensional, latitude-longitude-altitude regions in absolute geodetic coordinates (e.g. relative to WGS84 horizon). These predefined regions may be designated laser Inhibit or laser Allow areas.

In this illustrative embodiment, the safety computer module 101 performs safety calculations based on whether the laser will intersect the ground based on static terrain altitude data provided through the static configuration interface 109. The ground may be designated as a laser Inhibit or a laser Allow area. In other embodiments, the terrain altitude data may be dynamically loaded via another interface such as the WAN 110.

In this illustrative embodiment, the safety computer module 101 performs safety calculations based on the location of aircraft in the airspace surrounding the laser system. The real time location and velocity of these aircraft is provided by the Deconflication Data Interface 112 via the WAN 101. In other embodiments, this data may come via a different interface. Under normal conditions, the laser system 10 prevents the illumination of aircraft. However, some aircraft (e.g. the UAS) may be designated as a target and their illumination would be allowed.

In this illustrative embodiment, the safety computer module 101 performs safety calculations based on the location of satellites in Earth orbit that might be affected by the laser. The real time location and velocity of these satellites is provided by the Deconflication Data Interface 112 via the WAN 101. In other embodiments, this data may come via a different interface; for example, the satellite orbital ephemerides may be stored on the safety computer module 101, hard drive and accessed as static data 109 via connection 191. Under normal conditions the LSS 101, prevents the illumination of spacecraft. However, some spacecraft (e.g. laser calibration satellites) may be designated as a target and their illumination is allowed.

When performing the laser safety calculations, the safety computer module 101 takes into account delays in the system between the time that an unsafe (Inhibit) situation is calculated to occur and the lasers beam(s) turns off. In effect, the safety computer module will "look ahead" in time to identify the unsafe condition before it actually occurs, and then signal the fail-safe system 102 early enough that the laser(s) 103 are shut off by the time the unsafe condition actually occurs. This Look-Ahead feature works with all of the safety calculations including: two-dimensional safety regions, three-dimensional safety regions, terrain intersection, aircraft protection, and satellite protection. Additionally, this Look-Ahead feature also includes checks on the health of the real time data streams and uses sufficient "look ahead time" to mitigate unsafe conditions caused by hardware and software failures.

In the illustrative embodiment, safety calculations done by the safety computer module 101 take into account atmospheric refraction effects on the laser beam. In some embodiments, safety calculations done by the safety computer module 101 take into account whether an aircraft or satellite is susceptibility to the laser being used.

In some embodiments, the satellite calculations are done using methods defined by the US Air Force, Laser Clearing House (LCH). In some embodiment, the aircraft calculations are done using ADS-B data; in other embodiments, RADAR or telemetry data is used.

In the illustrative embodiment, the safety calculations are done at 1000 Hz. In other embodiments, calculations may be done slower or faster.

In the illustrative embodiment, the laser system 10 has a User Interface (UI). In other embodiments, it may not have a UI and may operate autonomously.

In the illustrative embodiment, the fail-safe system 102 is separate from the safety computer module 101. In other embodiments, the SCM and fail-safe system may be combined into the same package.

In the illustrative embodiment, the safety system 10 includes a fail-safe system 102. In other embodiments, the safety computer module 101 may communicate directly with the lasers 103 or the weapon system.

In the illustrative embodiment of FIG. 2, a data link 181 to a GUI 109. The data may be used to project safety information onto a video image of what the laser is targeting, similar to the heads-up display in many First Person Shooter (FPS) video games.

The laser system 10 for use in an outdoor laser system that concurrently protects people and assets: on the ground, on water, in the air, and in space. The laser system 10 may include a safety computer module, which preforms hazard calculations based on real-time inputs form the laser system 10, and a fail-safe interlock module that signals the laser system 10 when it is safe or not-safe to fire the laser 12.

The laser safety calculation may be performed in a predictive manner such that any future unsafe conditions are identified with sufficient lead time that the laser system 10 can be shut off before the predicted hazardous condition occurs. The laser safety calculation may include a future pointing direction and motion of the laser beam 22 and the future position and motion of: ground vehicles, watercraft, aircraft, and space objects is used in the safety calculation.

The safety calculations may make use of real time measurements of the current position and motion of: the laser beam 22, ground vehicles, watercraft, aircraft, and space objects. The predictive safety calculation may take into account potential data interruptions or delays caused by failures in the laser system 10, the laser system 10, or related interfaces and data links. In some embodiments, the safety calculations may be done at a high rate: more than 100 Hz.

In the illustrative embodiments, the computer module and the fail-safe module may be integrated into a single module 18. In other embodiments, if the failsafe module is not used, and the computer module directly may signal the laser system 10 when it is safe, or not-safe to fire.

In the illustrative embodiments, the computer module or the fail-safe module may be integrated into the laser system 10. The computer module may have a human interface 20 for configuration, operation, and maintenance. In some embodiments, the system 10 may run autonomously, without human intervention.

The human interface 20 may include at least one of a monitor, keyboard, mouse, game controller, or 3D display. In some embodiments, the interface 20 may include a graphical situational awareness display so that the operator can better understand when and where hazardous conditions may occur. In other embodiments, the human interface 20 may be remote from the laser system 10.

In some embodiments, the graphical user interface 20 may have an augmented reality display. In other embodiments the graphical user interface 20 may have a virtual reality display.

In some embodiments, the user may specify two-dimensional inhibit and allow regions 56, 46 defined in relative or absolute horizon coordinates (e.g. azimuth and elevation). Additionally, the user may specify three-dimensional inhibit and allow regions 56, 46 defined in geodetic coordinates (e.g latitude, longitude, and altitude).

The hazard calculations may take into account the varying susceptibility of different objects (e.g. people, aircraft, satellite, etc.) to the laser beam 22. If the laser system is moving, the hazard calculations may take into account the position and motion (e.g. latitude, longitude, and altitude) of the laser system 10, or the hazard calculations may take into account the orientation and motion (e.g. roll, pitch, and yaw) of the laser system 10. In other embodiments, the system may take into account the effects of atmospheric refraction on the laser beam 22.

In some embodiments, the data links to and from the modules may be either wireless or hardwired. In other embodiments, the data links to and from the modules may be encrypted In some embodiments, certain objects may be designated as targets 24 for the laser system 10, in which case the targets 24 may not generate a hazard, and illumination would be allowed. In other embodiments, a safety override function may be defined, such that the operator may prevent the laser system 10 from using certain types of data in the hazard calculation. This could include data on: terrain, aircraft, space objects, or predefined 2D and 3D hazard regions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A laser system comprising:
a laser configured to emit a laser beam,
a laser mount coupled with the laser to support the laser thereon, the laser mount configured to move the laser relative to an axis to cause the laser beam to illuminate a target first object while the target first object moves relative to the laser,
a sensor configured to generate data indicative of a location of a second object relative to the laser, and
a controller configured to block the laser from illuminating the second object with the laser beam, the controller configured to:
determine a path of the target first object relative to the laser;
generate instructions to move the laser mount to cause the laser beam to illuminate the target first object while the target first object moves along the path of the target first object;
detect the second object based on the data received from the sensor;
determine a path of the second object relative to the laser based on the data received from the sensor;
determine if the second object would be illuminated by the laser beam based on the path of the first target object, the path of the second object, and at least on one of the orientation and motion of the laser system relative to earth; and
generate instructions to block the laser from emitting the laser beam before the laser beam illuminates the second object if the controller determines the laser beam would illuminate the second object,
wherein the controller is configured to identify the second object and to generate the instructions to block the laser from emitting the laser beam in response to the controller i) identifying the second object as being an object included in a predetermined set of objects, and ii) determining that the laser beam will illuminate the second object.

2. The laser system of claim 1, wherein the controller is configured to determine if the laser beam will no longer illuminate the second object based on the path of the first target object and the path of the second object and generate instructions to cause the laser to emit the laser beam if the laser beam will no longer illuminate the second object.

3. The laser system of claim 2, wherein the controller is configured to not generate instructions to block the laser from emitting the laser beam if the controller identifies the second object as being an animal.

4. The laser system of claim 2, wherein the predetermined set of objects include people, satellites, and vehicles.

5. The laser system of claim 1, wherein the sensor is configured to receive telemetry data from the second object and to detect the second object and determine the path of the second object relative to the laser based on the telemetry data.

6. The laser system of claim 1, further comprising a user interface configured to receive location data indicative of the location of the second object from an operator of the laser system and the controller is configured to determine the path of the second object based at least in part on the data received from the user interface.

7. The laser system of claim 1, further comprising a user interface configured to receive allow region data indicative of a 2D space or 3D space from a user such that the laser beam is configured to move relative to the 2D space or 3D space and the controller is configured to generate instructions to allow the laser to emit the laser beam only in the 2D space or 3D space based on the allow region data, wherein the 2D space is defined in one of relative and absolute horizon coordinates and the 3D space is defined by latitude, longitude, and altitude coordinates.

8. The laser system of claim 1, wherein the laser includes an optical cavity and the instructions to block the laser from emitting the laser beam before the laser beam illuminates the second object include instructions to reduce a Q factor of the optical cavity, wherein the laser includes a faraday rotator switch configured to reduce the Q factor of the optical cavity.

9. The laser system of claim 1, wherein the instructions to block the laser from emitting the laser beam before the laser beam illuminates the second object includes reducing electric power to the laser, wherein the laser includes capacitors, a fan, and a cooler and the instructions to block the laser from emitting the laser beam before the laser beam illuminates the second object do not cause all electrical power to be removed from the capacitors, the fan, and the cooler.

10. The laser system of claim 1, wherein the controller is further configured to generate instructions to cause the laser mount to move such that the laser beam would illuminate the target first object while the target first object moves along the path of the target first object if the laser beam was being emitted.

11. The laser system of claim 1, wherein determining if the second object will be illuminated by the laser beam based on the path of the first target object and the path of the second object includes applying a first factor of safety zone around the first target object, applying a second factor of safety zone around the second object, and determining if the first factor of safety zone will overlap the second factor of safety zone based on the path of the first target object and the path of the second object.

12. The laser system of claim 1, wherein the sensor is one of a radio wave sensor, acoustic sensor, optical sensor, and telemetry data sensor.

13. The laser system of claim 1, further comprising a user interface configured to receive inhibit region data indicative of a 2D space or a 3D space around the laser from a user such that the laser beam is configured to move relative to the 2D space or 3D space and the controller is configured to generate instructions to block the laser from emitting the laser beam into the 2D space or 3D space based on the inhibit region data.

14. The laser system of claim 13, wherein the 2D space is defined in one of relative and absolute horizon coordinates and the 3D space is defined by latitude, longitude, and altitude coordinates.

15. A laser system comprising:
a laser configured to emit a laser beam,
a laser mount coupled with the laser to support the laser thereon, the laser mount configured to move the laser relative to an axis to cause the laser beam to illuminate a target first object while the target first object moves relative to the laser,
a sensor configured to generate data indicative of a location of a second object relative to the laser, and
a controller configured to block the laser from illuminating the second object with the laser beam, the controller configured to:
determine a path of the target first object relative to the laser;
generate instructions to move the laser mount to cause the laser beam to illuminate the target first object while the target first object moves along the path of the target first object;
detect the second object based on the data received from the sensor;
determine a path of the second object relative to the laser based on the data received from the sensor;
determine if the second object would be illuminated by the laser beam based on the path of the first target object, the path of the second object, and at least on one of the orientation and motion of the laser system relative to earth; and
generate instructions to block the laser from emitting the laser beam before the laser beam illuminates the second object if the controller determines the laser beam would illuminate the second object,
further comprising a user interface configured to receive inhibit region data indicative of a 2D space or 3D space from a user such that the laser beam is configured to move relative to the 2D space or 3D space and the controller is configured to generate instructions to block the laser from emitting the laser beam into the 2D space or 3D space based on the inhibit region data, wherein the 2D space is defined in one of relative and absolute horizon coordinates and the 3D space is defined by latitude, longitude, and altitude coordinates.

16. A method comprising:
emitting a laser beam with a laser,
determining a path of a target first object relative to the laser,
moving the laser to cause the laser beam to illuminate the target first object while the target first object moves along the path of the target first object,
detecting a second object,
determining a path of the second object relative to the laser,
identifying the second object as being an object included in a predetermined set of objects,
determining the laser beam will illuminate the second object based on the path of the first target object, the path of the second object, and at least on one of the orientation and motion of the laser relative to earth, and
blocking the laser beam from illuminating the second object before the laser beam illuminates the second object in response to the second object being identified as being included in the predetermined set of objects and the determination that the laser beam would illuminate the second object.

17. The method of claim 16, wherein determining the path of the second object relative to the laser is based on telemetry data received from the second object.

18. The method of claim 16, wherein blocking the laser beam includes one of reducing a Q factor of an optical cavity of the laser and blocking the laser from emitting the laser beam.

19. The method of claim 16, wherein determining the path of the second object relative to the laser includes determining a first position of the second object, determining a second position of the second object after determining the first position of the second object, and determining a third position of the second object based on the first position and the second position.

20. The method of claim 16, wherein the predetermined set of objects include people, satellites, and vehicles and the method further includes moving the laser beam relative to an inhibit region defined by a 2D space or a 3D space and blocking the laser from emitting the laser beam into the inhibit region.

* * * * *